United States Patent
Evans et al.

(10) Patent No.: US 9,617,394 B2
(45) Date of Patent: Apr. 11, 2017

(54) COATED PARTICLES FOR FORMING OF CONTINUOUS POLYMERIC OR METALLIC LAYERS

(71) Applicant: AeonClad Coatings, LLC, Austin, TX (US)

(72) Inventors: Robert Scott Evans, Austin, TX (US); Daniel John Verdell Pulsipher, Austin, TX (US); John Stockton, Austin, TX (US)

(73) Assignee: AeonClad Coatings, LLC, Austin, TX (US)

( * ) Notice: Subject to any disclaimer, the term of this patent is extended or adjusted under 35 U.S.C. 154(b) by 0 days.

(21) Appl. No.: 15/130,173

(22) Filed: Apr. 15, 2016

(65) Prior Publication Data

US 2016/0304677 A1    Oct. 20, 2016

Related U.S. Application Data

(60) Provisional application No. 62/147,900, filed on Apr. 15, 2015.

(51) Int. Cl.
| | | |
|---|---|---|
| *C08J 3/12* | (2006.01) | |
| *B05D 3/00* | (2006.01) | |
| *C09D 5/03* | (2006.01) | |

(52) U.S. Cl.
CPC ............ *C08J 3/126* (2013.01); *B05D 3/002* (2013.01); *C08J 3/12* (2013.01); *C09D 5/037* (2013.01); *B05D 2201/02* (2013.01); *B05D 2350/00* (2013.01); *C08J 2327/18* (2013.01); *C08J 2377/02* (2013.01); *C08J 2433/02* (2013.01); *C08J 2463/00* (2013.01); *C08J 2483/04* (2013.01); *Y10T 428/2982* (2015.01)

(58) Field of Classification Search
CPC .. B05D 3/02; B05D 2350/00; B05D 2201/02; C08J 3/126; C08J 3/12; C08J 2483/04; C08J 2463/00; C08J 2433/02; C08J 2377/02; C08J 2387/18; C09D 5/03; Y10T 428/2982

USPC ......................................................... 428/403
See application file for complete search history.

(56) References Cited

U.S. PATENT DOCUMENTS

| | | | |
|---|---|---|---|
| 4,247,508 A | 1/1981 | Housholder | |
| 4,863,538 A | 9/1989 | Deckard | |
| 4,944,817 A | 7/1990 | Bourell | |
| 5,132,143 A | 7/1992 | Deckard | |
| 5,876,753 A | 3/1999 | Timmons et al. | |
| 6,329,024 B1 | 12/2001 | Timmons et al. | |
| 6,482,531 B1 | 11/2002 | Timmons et al. | |
| 8,088,451 B2 | 1/2012 | Timmons et al. | |
| 8,691,935 B2 | 4/2014 | Harkabus et al. | |
| 9,120,125 B2 | 9/2015 | Timmons et al. | |
| 2006/0251535 A1* | 11/2006 | Pfeifer | B22F 1/02 419/36 |
| 2010/0098880 A1* | 4/2010 | Senff | C08L 77/02 427/554 |
| 2014/0053780 A1* | 2/2014 | Timmons | B01J 19/088 118/723 R |
| 2015/0099069 A1 | 4/2015 | Taylor et al. | |

FOREIGN PATENT DOCUMENTS

| | | | |
|---|---|---|---|
| WO | 01/40430 | | 6/2001 |
| WO | WO01/40430 | * | 6/2001 |

OTHER PUBLICATIONS

International Search Report/Written Opinion for PCT Application No. PCT/US2016/027792 issued Jul. 15, 2016.

\* cited by examiner

*Primary Examiner* — Leszek Kiliman
(74) *Attorney, Agent, or Firm* — Meyertons, Hood, Kivlin, Kowert & Goetzel, P.C.

(57) ABSTRACT

Particles for forming interconnected or continuous layers of material are, in some embodiments, composed of a Material A, a first central material comprising at least one meltable, softenable, or sinterable substance, and Material B, a second substantially thin material applied to the outer surface of said first material which is thermally or mechanically breachable.

19 Claims, 4 Drawing Sheets

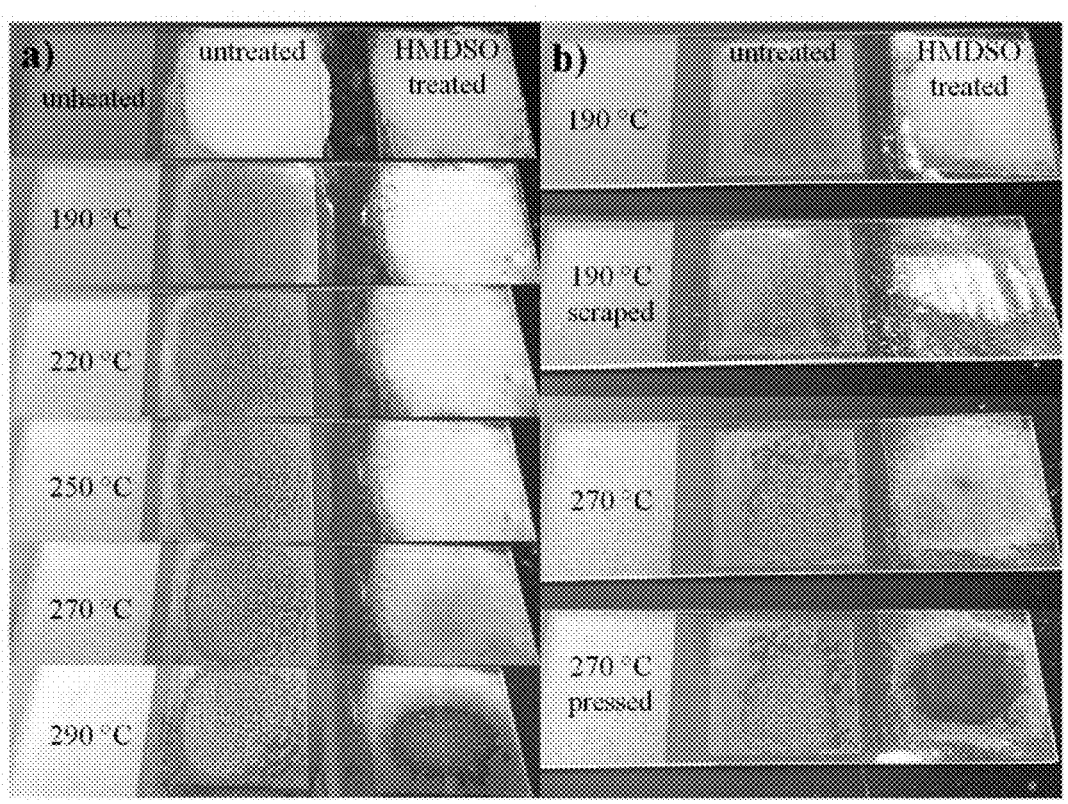
FIG. 1A                                  FIG. 1B
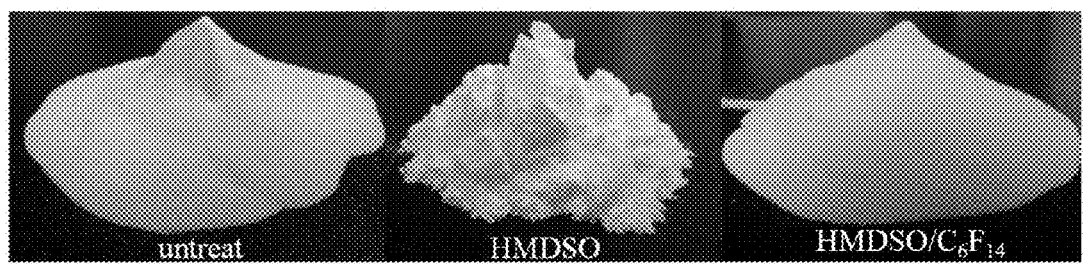
FIG. 2

COATED PARTICLES FOR FORMING OF CONTINUOUS POLYMERIC OR METALLIC LAYERS

PRIORITY CLAIM

This application claims priority to U.S. Provisional Application Ser. No. 62/147,900 entitled "COATED PARTICLES FOR THERMAL FORMING OF CONTINUOUS POLYMERIC OR METALLIC LAYERS" filed Apr. 15, 2015, which is incorporated herein by reference in its entirety.

BACKGROUND OF THE INVENTION

1. Field of the Invention

The invention generally relates to materials, methods and systems to create better material systems for forming interconnected or continuous layers from smaller constituent elements. These types of material systems can be employed in, for example, 3D printing or powder coating applications. More particularly, the present invention relates to methods and systems for performing deposition processes using plasma and the compositions of matter created.

2. Description of the Relevant Art

Powdered materials comprising active polymeric materials are used in a variety of industrial processes and products. These material types are used in composite materials as fillers, binding agents and in other functions. They can also be used to form interconnected or continuous material layers in powder coating or additive 3D printing processes where a layer of powder is first placed in a desired location and then processed, typically using some kind of heating method, to allow the powder particles to at least partially bond to form a continuous, though possibly porous, layer. For materials to perform well in these applications they need to have a variety of properties within certain ranges, including melt point, melt viscosity, enthalpy of formation, other chemical properties and particle features including size, size distribution, shape and surface roughness and other physical properties. For both powder coating and powder-based additive manufacturing, many combinations of materials have been used that include multiple polymers, flow agents, antioxidants, cross-linkers, coloring agents, reinforcing materials, flexible materials, insulating materials and other materials.

As solvent-free and environment-friendly coating systems, powder coating materials have acquired considerable importance and are preferred over solvent-borne coating materials in numerous fields of use. They often comprise binders, pigments, fillers and, where appropriate, additives and crosslinkers. They are in powdered or particulate form and are generally applied electrostatically to a large number of different substrates, on which they are typically processed by baking or by radiative energy. The powder coating materials must at least partially melt or soften during this heating process and form an interconnected or continuous layer and bond to the substrate.

There are a variety of additive technologies that can be used to build shapes from small, standard elements rather than formative approaches, such as molding, or subtractive approaches including machining. Other terms of art related to Solid Freeform Fabrication include '3D Printing', 'Additive Manufacturing', 'Rapid Prototyping' and 'Rapid Manufacturing'. The standard elements used in these processes can be thin filaments of material, powders, pastes or liquid elements. While some additive fabrication methods, such as Stereolithography, selectively cure portions of a material to form 3D objects, most additive processes use some kind of preferential heating. One commercial method for powder based additive manufacturing is selective laser sintering ("SLS") a term of art that can refer to both solid state sintering and to partial or complete melting of at least a portion of the powder particles or certain materials comprising the powder particles. SLS is used herein as one example of many additive processes for which the present invention has valuable application. For SLS processing, viable materials include metals, polymers, ceramics and combinations thereof. Similar to powder coating materials they are at least partially melted during a heating process and form bonds or fuse to a substrate. Since multiple layers are bonded together in SLS processes, they represent more complex processes. Even so, guiding principles and limitations of the SLS process, the focus of the following discussion, generally apply to powder coating materials as well.

In order to produce a shaped article using a typical SLS process, powder is applied in a thin layer to the top of a chamber having a movable bottom surface. The chamber is in a larger enclosure, which typically reduces exposure of the powder to oxygen and is heated to a precisely controlled temperature slightly below the melting point of the powdered material. A laser, or other energy directing means, is used to heat at least an outer region of the particles in a desired portion of the powder layer to a temperature above the melt point of at least one component of the powdered material. The heated particles can then bond together, which can include at least a portion of the particles flowing together, to form a layer of the shaped article. The layer thickness is selected so that heating from the laser substantially propagates through the layer. In many currently available SLS machines, computer controlled minors or other laser aiming approaches steer a laser to heat desired regions of the top powder layer. After this step, the bottom surface of the power chamber is lowered by an amount corresponding to the layer thickness, often from 0.1-2 mm. The procedure is repeated by applying a fresh layer of powder. After the preselected number of these cycles have been completed, a volume has been filled in the chamber with the intended number of layers and consisting of unbonded powder volumes and bonded powder volumes corresponding to the desired shaped article. Unbonded powder regions stabilize the shaped article during and after processing.

More complete descriptions of this selective laser sintering technology may be found in U.S. Pat. Nos. 4,863,538; 5,132,143; 4,944,817; and 4,247,508, all of which are incorporated herein by reference.

While shaped articles have been produced by SLS processing in a variety of materials, few are available commercially. Commercial SLS materials provide dimensional accuracy and precision, relatively smooth surface finish, relatively high-speed processing, an ability to reuse unbonded powder material more than once and costs that compete with more traditional fabrication routes. The ideal SLS material would match the dimensional tolerances and material properties of a molded or machined part and have superior costs when time, tooling, storage and the value of rapid part changes are also considered. In some cases, and especially for semicrystalline polymeric base materials, commercial sintering materials have more than one melt point, '$T_m$':(a) a first $T_m$('$T_{m1}$') when the material is melted a first time; and (b) a second $T_m$('$T_{m2}$'), which is lower than $T_{m1}$, when the material is melted or softened a second (or subsequent) time due to the material's transition from a crystalline to a more amorphous state. An SLS machine, comprising a powder chamber and an enclosure, as described above, can heat such material, and in particular the top layer of that material within the powder chamber, to a temperature below $T_{m1}$, yet near $T_{m2}$. Subsequent heating of a desired region of the powder layer by a laser or other means can melt at least a portion of the powder within those regions and melted elements of the powder can remain in a molten (or partially molten) state, without melting the remaining un-fused, or unbonded powder, because the melt point of the molten fraction of material then has a different melt point, $T_{m2}$. It is also possible for the molten fractions of powder to remain in at least a partially molten state while the subsequent layer is applied above it. Melting in the subsequent layer, combined with at least partially molten material in the previous layer allows for inter-layer bonding and can reduce stresses within the complete shaped object increasing the dimensional accuracy of the shaped article and precision of multiple shaped articles. Even so, shaped articles remain anisotropic. As an example, the strength (stiffness, elongation, peak stress, etc.) of shaped articles are typically higher in the plane of the powder layers (X and Y direction) than across multiple powder layers (Z direction). Higher part bed temperatures (the temperature at which the partially melted or sintered powder and the unmelted or unsintered powder is held) help with better adhesion in the Z direction and help relieve internal stresses which deform parts caused by formed layers cooling too quickly.

Titanium, iron, nickel and aluminum-based alloys have been demonstrated in what is called "Direct Metal Selective Laser Sintering". Metals do not typically have a $T_{m1}$ and $T_{m2}$, but do have relatively high thermal conductivity and heats of enthalpy. The heating of an upper layer tends to induce at least some melting in the previous layer to a greater extent than processes focused on polymeric materials. Machines used to process metals run at higher temperatures, have more carefully controlled gas environments and higher laser powers when compared to machines designed to process polymeric materials. Still, the basic idea that a loose powdered material needs to co-exist in close proximity with a partially molten version remains for metallic materials in SLS.

The density and interlayer bonding within a shaped article are partly determined by the melt rheology of the molten portion of the powdered materials. Ideally, a shaped article produced via SLS would approach the density of an unpowdered, solid volume of the material. Low viscosities are typically related to higher density, closer to a solid part from a lower powder density, and to stronger parts, due to improved interlayer bonding. Melt viscosity of molten materials tends to fall with increasing temperature. The temperature that can be reached is limited by the laser or other heating means used, by a desire to perform the heating rapidly and by a desire to limit heating to regions that are desired to become part of the shaped article. A commercial SLS material must reach a sufficiently low melt viscosity within a bounded temperature increase.

Further, higher enthalpy of fusion in the powdered material corresponds to lower geometric tolerances of the shaped article. Materials having lower enthalpies of fusion tend to exhibit bonding between particles outside of desired regions, since heat conducts beyond the regions heated by the laser or other energy addition means. This effect also tends to reduce the ability to reuse materials in the powder chamber that do not become a part of shaped articles.

Since SLS powders are held at elevated temperatures, thermal degradation of the materials can occur, limiting the desired properties of the shaped articles and the recyclability of the powder. The formation of shaped articles can take several hours in an SLS process, exposing powdered materials to elevated temperatures for significant periods of time. Anti-oxidant materials are often mixed into SLS powders and low-oxygen atmospheres are maintained in SLS enclosures to counteract these effects. Degradation, in terms of SLS materials, can also refer to changes to the molecular structure of a material, surface or bulk chemical reactions beyond those involving oxygen or other changes, whether or not they are enhanced by aging or exposure to elevated temperatures, where the changes to an SLS material reduce the effectiveness of SLS in creating viable parts.

Physical properties of the powdered material particles are also important in current SLS technologies. A powdered material will have a density determined in part by powder particle size, particle size distribution, particle sphericity, particle surface roughness. Larger particles and tighter size distributions generally increase powder density as do lower roughness and higher sphericity. 'Flow agents', such as fumed silica are mixed into SLS powders to reduce inter-particle friction and other physical interaction which allows the powders to 'flow' to higher densities within the powder chamber.

The number of materials that can support the commercial SLS production of shaped articles, that meet melt rheology, complex melt point, enthalpy of fusion, thermal degradation and physical characteristics, remain very limited. For this reason the types of shaped articles and the applications they can address are also limited. Similarly, material options for powder coating are also limited. In these and other related application a much larger set of materials is desired.

Monsheimer, Sylvia et al. in U.S. Patent Application Publication No. 2004/0102539 propose how using a polyamide having an excess of carboxy end groups can be beneficial in SLS. They demonstrate that the bulk chemical composition of the polyamide can improve the recyclability of a powder when used in SLS production.

Barlow et al. in U.S. Pat. No. 6,048,954 highlights some of the benefits that can be achieved by coating powered materials for SLS, which in their case are metal or ceramic powders. They use lower melting and lower molecular weight coatings as binders to hold the particles together long enough to fuse or sinter the parts in a post process after which the binder is mostly calcined or baked off. Others in U.S. Pat. Nos. 5,076,869, and 6,814,926 similarly coat or blend metal particles with a polymer which is used to hold the coated powders together after an SLS process until they can be further fused or reinforced with a metal infiltration process. Monsheimer, Sylvia et al. in U.S. Pat. No. 7,988, 906 demonstrate a benefit of coating materials which have melting points too high to run in normal SLS machines with cyclic oligomers. The cyclic oligomer rings are then opened and polymerized to hold the coated materials together. Preifer et al. in U.S. Patent Application Publication No. 2006/0159896 coat powdered particles for use in SLS with a material that has a softening point lower than 70° C. (closer to room temperature) to help bond the particles at lower bed temperatures. Preifer et al. in U.S. Patent Application Publication No. 2006/0251535 take this coating concept further by using an activatable adhesive as the material which coats the powdered particles. These methods all rely on the coating material to be the active material that holds or glues the particles together in order to make a part or to form a part that can be further processed and/or hardened.

SUMMARY OF THE INVENTION

To address the deficiencies of the prior art, a coating is used to contain the base material while it is in a molten or softened state. The base material will furthermore be the active material, and the base material will be used to form the majority of a continuous layer together after mechanical or thermal energy is applied to the molten or soften material.

In an embodiment, coated particles for forming interconnected or continuous layers of material including: Material A comprising at least one meltable, softenable, or sinterable substance; and Material B comprising a material which is thermally or mechanically breachable. Material B at least partially covers an outer surface of said first material. Material B inhibits Material A from fusing to, combining with, or reacting with adjacent coated Material A when the coated particles are held at a temperature higher than the melting, softening or sintering point of uncoated Material A. Material A constitutes the main material of the resulting formed interconnected or continuous layer or layers of material.

In an embodiment, Material A is a thermoplastic polymer. The thermoplastic polymer may be a semi-crystalline polymer or may be an amorphous polymer. Exemplary thermoplastic polymers include, but are not limited to: polyamides, polyester, polyacrylate, polyacetal, and polycarbonate. Other exemplary thermoplastic polymers include, but are not limited to: polyethylene, polypropylene, polystyrene, and polyvinyl chloride. In some embodiments, Material A is a polyether ether ketone, polysulfone, polyetherimide, polyphenylene sulfide, and fluoropolymers. In some embodiments, Material A comprises a metal. In some embodiments, Material A comprises a precursor of a thermoset polymer.

In an embodiment, Material A is a thermoplastic elastomer. The thermoplastic elastomer may be a copolymer or a physical mix of polymers that result in a material that has both thermoplastic and elastomeric properties. Exemplary thermoplastic polymers include, but are not limited to: styrenic block copolymers, thermoplastic olefins, elastomeric alloys, thermoplastic polyurethanes, thermoplastic copolyesters, and thermoplastic polyamides.

Material A may be an agglomerate of particles. Material A may be a composite of a polymer and an additive that alters the properties of the polymer.

Material B may be deposited onto Material A from a plasma phase. Material B may result from a treatment that etched, crosslinked, or densified the surface of Material A. Material B may be grafted by a monomeric unit to Material A, or deposited from a plasma activated depositing precursor. In some embodiments, Material B is a silicone or silica. In some embodiments, Material B is a fluoropolymer. In some embodiments, Material B is a polyolefin, a polyacrylate, a polyamine, a polyamide, or an epoxy. In some embodiments, Material B is a metal. In some embodiments, Material B is a ceramic material. Material B may be composed of two or more layers of different materials.

In an embodiment, coated particles for forming interconnected or continuous layers of a composite material include: Material A1 and Material A2, wherein Material A1 and Material A2 are precursors of the composite material; and Material B comprising a material which is thermally or mechanically breachable. Material B at least partially covers an outer surface of Material A1 and Material A2. Material B inhibits Materials A1 and A2 from fusing, combining, or reacting with each other, until the Material B coating is thermally or mechanically breached. Materials A1 and A2 fuse, combine, or react with each other to form the composite material when the Material B coating of the coated particles is thermally or mechanically breached.

In one embodiment, the composite material is a thermoset polymer. In a specific example, the thermoset polymer is an epoxy resin formed from Material A1 and Material A2, where Material A1 is an epoxide polymer and Material A2 is a crosslinker material capable of reacting with the epoxide group of Material A1. In one embodiment, the composite material is a metal alloy, and wherein Material A1 is a metal component of the metal alloy and Material A2 is a metal component of the metal alloy.

In an embodiment, a method of forming a 3D object from coated particles includes: obtaining coated particles as described above, heating the coated particles to a temperature sufficient to melt or soften Material A; and thermally or mechanically rupturing the Material B coating in at least a portion of the coated particles, such that the coated particles having a breached Material B coating fuse to, combine with, or react with each other to form a portion of the 3D object.

In one embodiment, the coated particles are heated to a temperature sufficient to melt or soften Material A, and wherein the melted or softened particles of Material A are fused, combined, or reacted together by thermally breaching the Material B coating from at least a portion of the coated particles after the coated particles are heated to a temperature sufficient to melt or soften Material A.

In one embodiment, the coated particles are heated to a temperature sufficient to melt or soften Material A, and wherein the melted or softened particles of Material A are fused, combined, or reacted together by mechanically breaching the Material B coating from at least a portion of the coated particles after the coated particles are heated to a temperature sufficient to melt or soften Material A.

BRIEF DESCRIPTION OF THE DRAWINGS

Advantages of the present invention will become apparent to those skilled in the art with the benefit of the following detailed description of embodiments and upon reference to the accompanying drawings in which:

FIGS. 1A and 1B depict the results of thermal testing of HDMSO plasma treated Nylon-12 particles;

FIG. 2 depicts the consistency of HMDSO treated powder in comparison to untreated powder and the HMDSO/$C_6F_{14}$ treated Nylon-12 particles;

Figure 3:
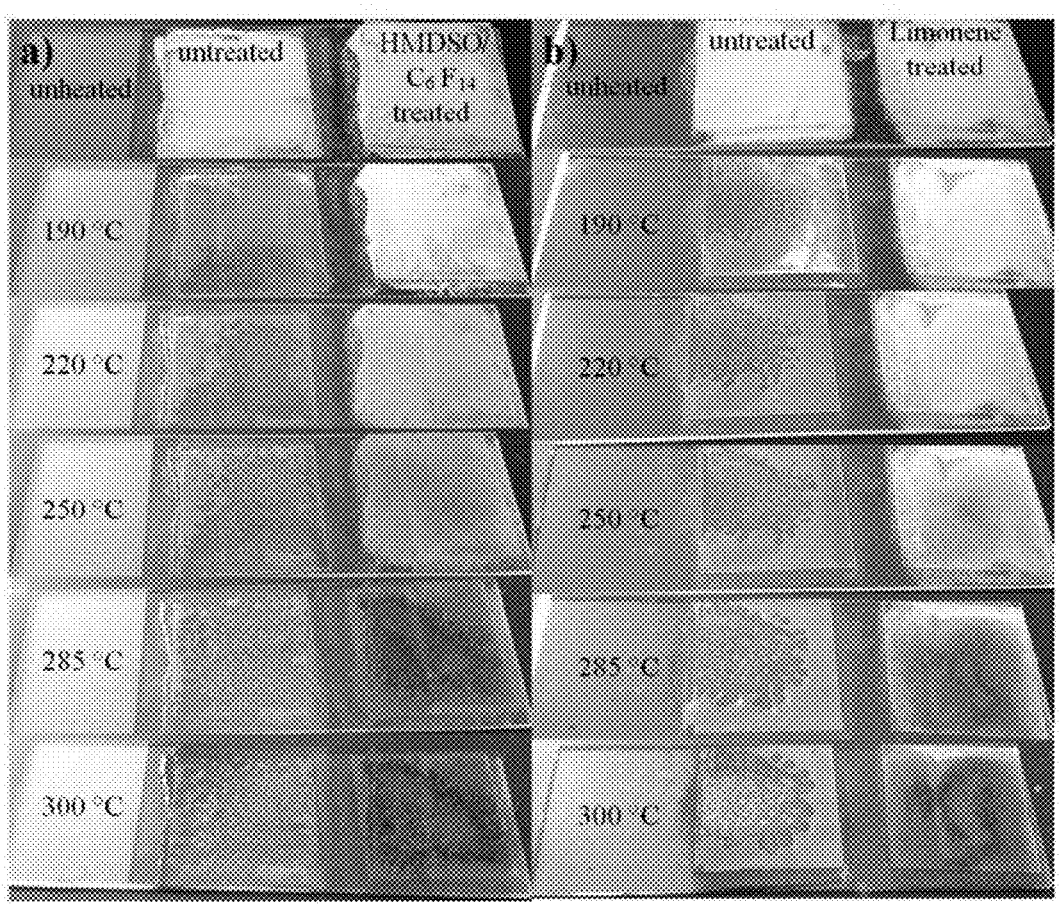
FIGS. 3A and 3B depict the results of thermal testing of HMDSO/$C_6F_{14}$ plasma treated Nylon-12 particles.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

As used herein, the term "thermoplastic polymer" refers to a polymer that becomes pliable or moldable above a specific temperature (the glass transition temperature, $T_g$) and solidifies upon cooling below the glass transition temperature. Thermoplastic polymers may also be melted by heating above the melting temperature of the polymer. Exemplary thermoplastic polymers include, but are not limited to: acrylic polymers (e.g., poly(methyl metacrylate); acrylonitrile butadiene styrene (ABS); polyamides (e.g., various nylons); polylactic acid (PLA); polybenzimidazole (PBI); polycarbonates, polyethersulfones; polyetherether ketone (PEEK); polyetherimides (PEI); polyethylene (PE); polyphenylene oxide (PPO); polyphenylene sulfide (PPS); polypropylene (PP); polystyrene (PS); polyvinyl chloride (PVC); fluoropolymers (e.g., polytetrafluoroethylene).

As used herein, the term "semi-crystalline polymer" is a polymer in which the degree of crystallinity ranges between about 10% to about 80%. As used herein, the term "amorphous polymer" is a polymer that does not exhibit any appreciable crystalline structures. Exemplary semi-crystalline polymers include thermoplastic polymers having a crystallinity of at least about 10%.

As used herein, the term "thermoplastic elastomer" is a class of copolymer or mixture of polymers which contain both thermoplastic and elastomeric properties. They have advantages of being both rubber and plastic like.

As used herein, the term "thermoset polymer" is a polymer formed from a one or more precursors in a liquid, soft solid or viscous state that changes irreversibly into an infusible, insoluble polymer network by curing. Exemplary thermoset polymers include: polyesters (e.g., fiberglass); polyurethanes; phenol formaldehyde resin; urea-formaldehyde; melamine resin; diallyl-phthalate (DAP); epoxy resin; polyimides; and polycyanurates.

In an embodiment, individual powder particles include at least one material, 'Material A,' that has a first melting temperature and a 'Material B' which coats at least a portion of the surface of at least a portion of a collection of particles. In some embodiments, Material B has a melting point that is different from the melting point of Material A. Material B may be applied to Material A as a substantially thin layer of material deposited from a liquid, gas or plasma phase. A variety of coating materials (Material B) have been shown to improve powder properties to enhance processability Enhanced processability of powders leads to improved final shaped article or cured coating layer properties. Further improvements include maintaining powder color, reducing powder material degradation, improving powder flow, allowing the powder to behave like powder closer to or even above the melt or softening point of Material A, reducing in process stresses (curling), and other improvements.

Embodiments described herein allow for coating of particles having the desired size for the production of a 3D solid object. In some embodiments, the "coated particles" may actually be agglomerates of smaller particles that reach a desired size. A resulting population of both coated Material A particles and agglomerates may represent a mixture having a tighter particle size distribution and improved powder flow.

Laser heating, such as with an Excimer or Carbon Dioxide laser, can be very rapid. The speed of temperature increase can create physical shock within the material or cause separation at interfaces between different materials. In the embodiments described herein, laser heating may cause Material B to melt, or at least partially fracture due to thermal pressure. Laser heating may also reduce the bonding between Material A and Material B, creating a "thermal" rupture of Material B which permits Material A in adjacent particles to interact. The Material B coating, may be selected or engineered such that it will improve interactions with, wetting, or bonding between coated particles. Material B may also improve particle interactions during the formation of interconnected or continuous layers of Material A.

In some embodiments, Material A may be composed of a polymer. In preferred polymer embodiments, Material A is a thermoplastic polymer. Material A can be an amorphous, crystalline, or semi-crystalline material having a small or non-existent difference between $T_{m1}$ and $T_{m2}$, if it has any definable $T_m$, at all. Material A can be a thermoplastic elastomer. Material B can be any material that can support the polymer particles and prevent their fusion, combination, or reaction when the particles are heated at or above the glass transition temperature ($T_g$) or melting point $T_{m1}$ of the polymer. Furthermore, when the coated particles are heated at to sufficient temperatures, Material B may impart a low enough viscosity to promote bonding, especially within an SLS process.

In a some embodiments, Material B used to coat Material A can be chosen from: 1) ceramics (e.g., silicon nitride, silicon oxide, aluminum nitride, and aluminum oxide); 2) at least partially cross-linked polymers; 3) cross-linked, or more cross-linked versions of Material A; 4) semicrystalline thermoplastic polymers; 5) at least partially cross-linked thermosetting polymers; 6) amorphous thermoplastic polymers; or 7) metals. Specific examples of Material B include, but are not limited to: polyolefins, a polyacrylates, polyamines, polyamides, and epoxy resins. When Material B is plasma deposited, the deposition/treatment method allows a high degree of control over the amount and type of functional groups available on the surface of the coating. Plasma deposited coatings also allow control over the thickness, and the amount of cross-linking the plasma deposited polymer will have. The amount of cross-linking a deposited polymer has will affect the coating's softening point and how brittle or flexible it is. Exemplary processes for coating particles are described in the following U.S. patents, all of which are incorporated herein by reference: U.S. Pat. No. 5,876,753 to Timmons et al.; U.S. Pat. No. 6,306,506 to Timmons et al.; U.S. Pat. No. 6,329,024 to Timmons et al.; U.S. Pat. No. 6,482,531 to Timmons et al.; U.S. Pat. No. 8,088,451 to Timmons et al.; U.S. Pat. No. 8,691,935 to Harkabus et al.; U.S. Pat. No. 9,051,402 to Timmons et al.; and U.S. Pat. No. 9,120,125 to Timmons et al.

In some embodiments, Material A could be a composite that is then coated at least in part with Material B. For example, Material A could be a composite composed of a polymer and an additive that is used to alter the properties of the polymer. For example, a composite may be formed from a polymer that is combined with an additive used as a flame retardant, a pigment, a strengthening fiber, or to alter the heat absorbing properties of the polymer (e.g., heat absorbing nanoparticles). In a specific embodiment, Material A is a powder coating paint, composed of a resin system combined with additives and/or pigments.

In some embodiments, Material B may be composed of multiple layers of differing composition. Material B, in an embodiment, is composed of an outer layer of a crosslinker material and an inner layer that prevents the crosslinker from reaching Material A. For example the inner layer may be a polymer base for the crosslinker that makes up the outer layer of Material B.

In some embodiment, the outer layer of a Material B may provide a low friction coating of the Material A. For example, a fluoropolymer (e.g., polytetrafluoroethylene) layer, deposited from a plasma with a perfluoro precursor, may be used to reduce friction and/or electrostatic interactions between particles of Material A.

In some embodiments, Material B is a ceramic material with greater structural rigidity than the underlying material A. Ceramic coatings could be combined with fluoropolymer coatings. For example, the ceramic layer may be used as the inner layer in Material B to protect Material A from the fluorinated radicals that are a part of a fluoropolymer layer deposition process.

Material B may also be formed from a material that includes functional groups that will improve interactions with, wetting, or bonding with adjacent uncoated Material A particles or adjacent coated particles. When Material B is plasma deposited, coatings that have a gradient composition are possible where for example Material B is initially deposited as a brittle inorganic like material and then transitions to a more organic like coating.

In some embodiments, coated particles are used to form a thermoset polymer. Thermoset polymers are formed when a polymer is mixed with a catalyst for internal crosslinking, or when a polymer is reacted with a crosslinking agent capable of forming crosslinks with functional groups of the polymer. In an embodiment, Material B is used to individually coat at least two different Material A options, Material A1 and Material A2. When the treated Material A1 and A2 powders have been coated with Material B and are mixed together, Materials A1 and A2 are able to meet in at least a partially molten state and not otherwise interact due to Material B. For example, Materials A1 and A2 can be the two parts of a reactive polymer system for forming an epoxy resin. Epoxy resins are formed from an epoxide polymer and a polyfunctional amine crosslinker. In an embodiment, a laser is used to heat the mixture of coated Material A1 (epoxide polymer) and coated Material A2 (polyfunctional amine) which enables a crosslinking reaction to occur when the coating is thermally ruptured or breached.

In some embodiments, Material A comprises a semicrystalline polymer particle which is at least partially coated with a layer of fluoropolymer (e.g., polytetrafluoroethylene) as Material B. Fluoropolymers are known in the art to resist chemical attack, thereby reducing oxidation or other thermal degradation in Material A. A fluoropolymer layer can also inhibit bonding between particles to a degree, allowing for the powder bed to be held at a higher temperature, effectively making the powder behave like there is a larger difference between $T_{m1}$ and $T_{m2}$.

In a more specific embodiment, Material A can be a variety of Nylon-11. Semi-crystalline polymers currently used in commercial SLS applications include a particular precipitation polymerized Nylon-12 and some Nylon-11 materials as well. Nylon-11 has superior strength properties compared to the Nylon-12, but a much smaller difference between $T_{m1}$ and $T_{-2}$. Nylon-11 requires the use of a smaller area at the center of the powder chamber compared to Nylon-12 for shaped article formation, since the edges of the chamber tend to have larger temperature gradients. It also has a lower recyclability and a greater tendency for particles near laser scanned areas to also bond together. A coating inhibiting that bonding, and allowing the entire bed to be used would represent a major advance for the SLS industry. The average particle size for Nylon-11 materials is around 40-microns. In some embodiments Material B may have layer thicknesses from about 3 to 500 nanometers. In some embodiments Material B used to coat Nylon-11 material is a silicone and/or silica formed from precursors comprising hexamethylenedisiloxane.

In another specific embodiment, Material A is a powdered Nylon-6 material having little, if any, difference between $T_{m1}$ and $T_{m2}$. The Nylon-6 can be coated as outlined above with a silica and or silicone-like material deposited from, in one embodiment a plasma containing hexamethyldisiloxane. The composite particulate material can be heated above the melt or softening temperature, $T_m$, of the Nylon 6 while limiting the interaction of adjacent particles such that powder-like properties are retained.

In some embodiments, Material A is a metal. When the active material in Material A is metallic, Material B can provide one or more functions including, but not limited to: friction reduction; passivation against chemical reactions; and preservation of powder-like bulk material when the coated metal is heated at, or above, the melt point of the metal Material A. For metal particles, Material B may be a ceramic material deposited from a plasma phase. Exemplary ceramic materials include, but are not limited to: silicon nitride, silicon oxide, aluminum nitride, and aluminum oxide.

In one embodiment, Material A may be a metal alloy and Material B can be a pure form of the one or more metals present in the metal allow. For example, Material B may be a pure form of the metal which makes up a majority of the alloy. Typically, alloys have lower melt points than pure metals. As one example, 6061 Aluminum, an alloy of aluminum that includes iron, silicon, tin and other metals has a melt point of about 620° C. while pure aluminum melts at about 660° C. Having Material B as a substantially pure metal, means that it would become a part of a final alloy. To minimize the effect of a pure metal coating on the alloy properties, the volume fraction for Material B can be kept low. As an example, an alloy powder having an average particle size of 30 microns, typical for SLS processes, can be coated with a 5 nanometer layer of pure metal that is a component of the alloy. In this case, Material B would make up less than 0.05% of the total, composite particle volume, an insignificant fraction in terms of the final alloy composition. It is also possible that Material B can serve a reinforcing role in a final shaped article.

In another embodiment, Material A is a metal and Material B is a metal or ceramic material that results in a particle with a higher softening or melting point. As an example, high sphericity, atomized aluminum alloy powders are readily available commercially. With such a material selected as Material A, a pure aluminum layer can be deposited by the present invention on the surface of the alloy particles to form a Material B.

In an embodiment, coated particles can be used to form alloys. Alloys are formed when two or more metals are combined to form a mixed metal where one or more "solute" metals are "dissolved" in a "base" metal. In an embodiment, Material B is used to individually coat at least two different metals which can be combined to form an alloy, Metal A1 and Metal A2. In an embodiment, a laser is used to heat the mixture of coated Metal A1 and coated Metal A2 which enables the alloy to form when the coating is thermally ruptured.

EXAMPLES

The following examples are included to demonstrate preferred embodiments of the invention in enabling detail. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

A nylon powder (Nylon-12) used in SLS was coated by treatment in a plasma chamber with a volume of 0.005 m$^3$ as described in U.S. Pat. Nos. 5,876,753; 6,329,024; 6,482,531; 8,088,451; and 8,691,935; and U.S. patent application Ser. Nos. 14/068,575 and 14/508,222, all of which are incorporated herein by reference. The plasma treatment consisted of an hexamethyldisiloxane (HMDSO) monomer that was used with the following plasma conditions: 20 sccm HMDSO flow, 200 W peak plasma power, 30% duty cycle, 100 Hz frequency, with the plasma on for 1 hr. This plasma treatment was used to mostly encapsulate the particles.

A thin layer of the HMDSO plasma treated powder and untreated powder were both placed on the same microscope slide and heated on a hot plate to 190±10° C. which is above the melting point ($T_{m1}$) of the untreated nylon. The untreated powder melted and bonded the cover glass to the glass slide while the treated powder remained as a powder and did not bond the cover glass to the glass slide (see FIG. 1A). Both untreated and treated powders were heated at 5 min intervals up to 290±10° C. The untreated nylon began to discolor about the same time as the treated nylon began to discolor. It took up to 290±10° C. for the treated powder to begin to fuse together on its own. FIG. 1B demonstrates that the HMDSO plasma treated powder can be scraped off after it has been cooled and it still behaves like powder even though it has been heated to 190±10° C. which is beyond the melting point of the underlying material particulates. The coating can be ruptured mechanically with pressure or sheer force if the underlying material is heated above its melting point and this is demonstrated in the bottom of FIG. 1B by the slide that was heated to 270±10° C. and then cover slide was pressed by hand to rupture the coated particles and allow them to flow and bind together.

A nylon powder having particle characteristics typical of commercial SLS materials was treated in a plasma chamber with two subsequent treatments performed at two different conditions. The first plasma treatment was the same as that which was performed in HMDSO treatment referred to previously consisting of: 20 sccm HMDSO flow, 200 W peak plasma power, 30% duty cycle, 100 Hz frequency, with the plasma on for 1 hr. The second plasma treatment was performed using the following conditions: 90 sccm perfluorohexanes ($C_6F_{14}$), 400 W peak plasma power, 10% duty cycle, 20 Hz frequency, with the plasma on for 1 hr.

The first plasma treatment protected or encapsulated the particles and the second plasma treatment improved the dry flow of the particles. The dry flow of the treated particles from Example 1 appeared suboptimal for use as a 3D printed SLS powder. FIG. 2 demonstrates the lower flow and more powder like consistency of the HMDSO treated powder in comparison to untreated powder and the HMDSO/$C_6F_{14}$ treated powder. The HMDSO/$C_6F_{14}$ treated particles exhibit a much smoother cascade than the other two samples when the graduated cylinder containing them was inverted against the table top and then slowly raised.

A thin layer of the HMDSO/$C_6F_{14}$ treated powder and untreated powder were both placed on the same microscope slide and heated on a hot plate to 190±10° C. which is above $T_{m1}$ of the untreated nylon. The untreated powder melted and bonded the cover glass to the glass slide while the treated powder remained as a powder and did not bond the cover glass to the glass slide (see FIG. 3A). Both untreated and treated powders were heated at 5 min intervals up to 300±10° C. The HMDSO/$C_6F14$ treated nylon began to discolor and yellow at 220±10° C. before the treated nylon began to discolor. It took up to 285±10° C. for the treated powder to begin to fuse together without further applied pressure or sheer force and it continued to fuse together more at 300±10° C.

A nylon powder used in SLS was treated in a plasma chamber. The plasma treatment consisted of a limonene monomer that was used with the following plasma conditions: 10-15 sccm limonene flow, 150 W peak plasma power, 20% duty cycle, 500 Hz frequency, with the plasma on for 3 hr. This was followed by a 6 min $H_2$ plasma treatment using with the following plasma conditions: 12 sccm H2 flow, 50 W peak plasma power, 5% duty cycle, 200 Hz frequency.

A thin layer of the limonene treated powder and untreated powder were both placed on the same microscope slide and heated on a hot plate to 190±10° C. which is above $T_{m1}$ of the untreated nylon. The untreated powder melted and bonded the cover glass to the glass slide while the treated powder remained as a powder and did not bond the cover glass to the glass slide (see FIG. 3B). Both untreated and treated powders were heated at 5 min intervals up to 300±10° C. The limonene treated nylon began to discolor and yellow at 220±10° C. before the treated nylon began to discolor. It took up to 285±10° C. for the treated powder to begin to fuse together without further applied mechanical pressure or sheer force and it continued to fuse together more at 300±10° C.

Figure 4:
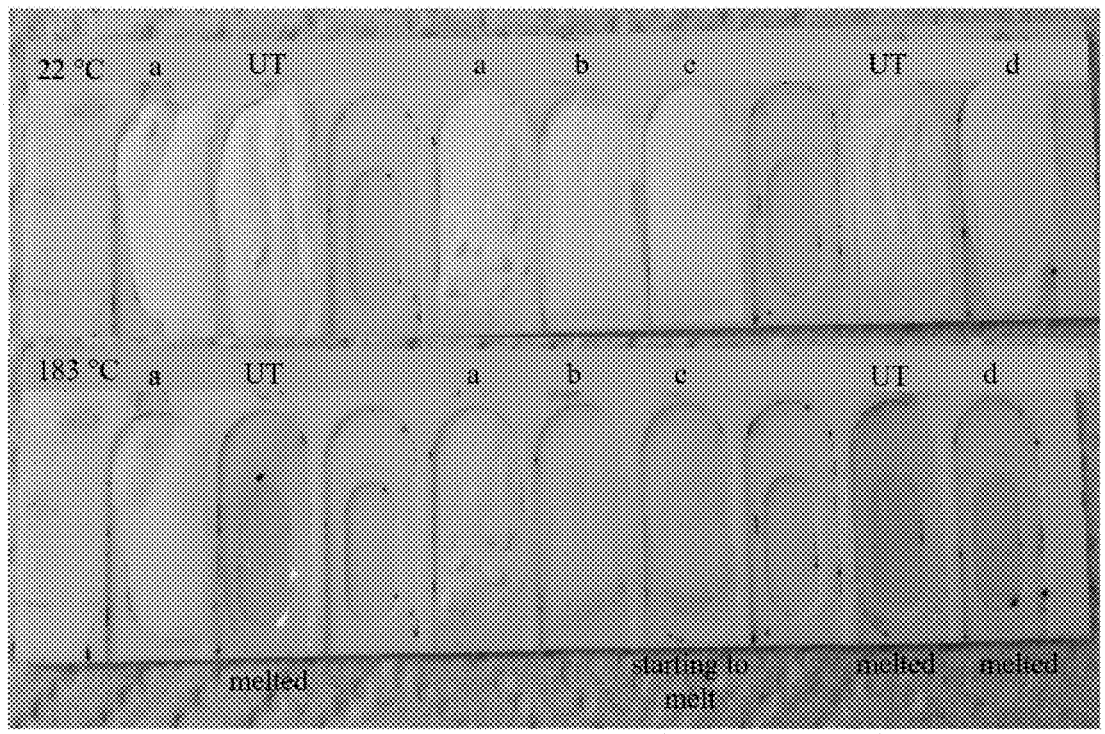
FIG. 4 depict the results of thermal testing of acrylic acid plasma treated PA12-2002 SLS particles.

A PA12-2002 SLS powder supplied by EOS was treated in a plasma chamber. The plasma treatment consisted of an acrylic acid monomer that was used with the following plasma conditions: 300-600 m Torr partial pressure of acrylic acid, 150 W peak plasma power, 5% duty cycle, 5 Hz frequency, with the plasma on for 3, 8, 13, and 18 min to result in samples a, b, c, and d respectively. Samples a-d and two samples of untreated nylon 12 (UT) were place on a Teflon holder at room temperature 22° C. as shown by the top image in FIG. 4. Two samples of untreated and "sample a" treated powder were used to help rule out possible temperature differences over the length of the Teflon holder. The same samples are shown in the bottom image of FIG. 4 after they were placed in a Fisher Scientific Model 737F isotemp oven at 183° C. for 15 min. The both untreated powders started melting and turning transparent before the treated powders started melting and in contradiction to other coatings systems used, the powder that was treated/coated for the least amount of time appeared more powder like than the particles that were treated for longer at the conditions used. In addition the treated powders did not yellow nearly as much as the untreated material. The treatment thus changes both how the powder melts and how much air affects its color.

Figures 5A, 5B:
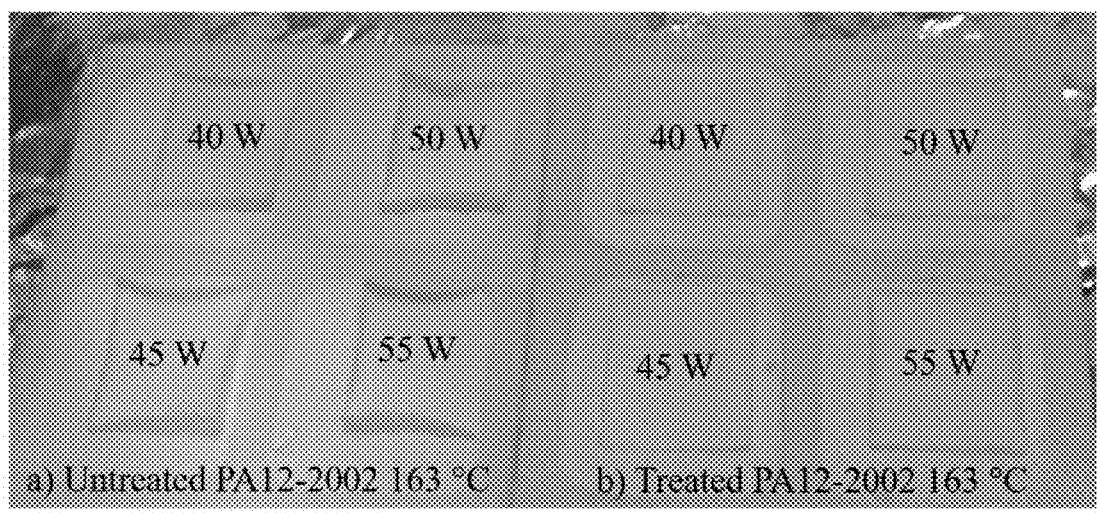
FIGS. 5A and 5B depict the effect of coating on the production of a 3D object using SLS sintering.

EOS supplied PA12-2002 untreated and treated powder was scanned in a 3D Systems Sinterstation model 2500 machine. The powder was treated in a 0.04 m³ reactor using 40 sccm of HMDSO flow, 10 sccm of 3% $H_2O_2$ flow, 600 W peak plasma power, 25% duty cycle, and 50 Hz frequency, with the plasma on for 8 min. Teflon trays were made to place on the powder bed and hold small amounts of powder whereon single layer scans could be tested. The powder bed was held at 163° C. and the laser scanned once over the top layer of powder. The laser was set with a 0.008" scan density and was set to scan at multiple powers of 40, 45, 50, 55 W in four different squares as shown in FIG. 5. The untreated material, FIG. 5A, resulted in more drastic curl of the thermally fused layer than the treated material, FIG. 5B, after being scanned and cooled under the same conditions. Both materials show slightly more curl as the power of the scanning laser was increased.

Figure 6:
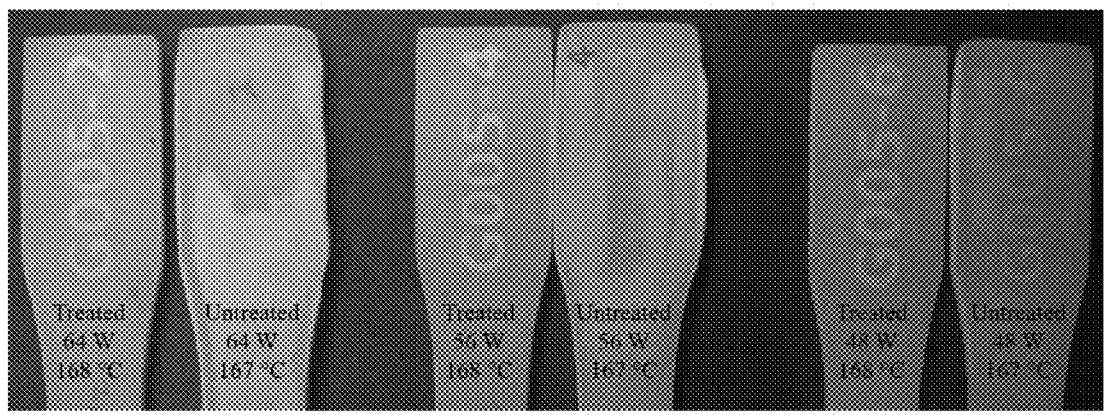
FIG. 6 depicts improved resolution at higher temperatures when using coated particles in the production of a 3D object using SLS sintering.

The same material was used to make dog bones with the part bed temperature in the SLS machine held at 168° C. for the treated powder and 167° C. for the untreated powder with all other parameters held constant. The laser power was changed to 48, 56, and 64 W as it was used to sinter different dog bones at a constant laser spacing of 0.008 inches. FIG. 6 shows the dog bones created for both materials. The untreated powder resulted in dog bones with less dimensional stability. This can be seen readily by the legibility of the imprinted numbers on each dog bone. When examining the dog bones that were laser sintered from the untreated powder, the number G005-6 can be seen when the powder was sintered with a 48 W laser, but the indented letters are smaller than they should be; only a part of the number 4 can be seen on the G005-4 dog bone (sintered with a 56 W laser), and no number can be seen on the G005-2 dog bone (sintered with a 64 W laser). The numbers can be seen clearly on all of the dog bones which were laser sintered using treated powder. After the treated powder is laser sintered and while it is still hot, it does not significantly fuse to neighboring powder that has not been laser sintered. These single layer scans and sintered dog bones both demonstrate that the treated material has the benefit of being run under wider conditions than the untreated material in an SLS machine.

A first portion of powdered PTFE was coated with a layer of amine functionalization and then was mixed with an epoxy resin while a second portion of PTFE powder was coated with partially reacted epoxy functionalization and was then mixed with an epoxy hardener. These materials were separately pulverized and coated with a thermally breachable plasma deposited coating. Then the resulting powders were mixed together and did not react. Upon heating the viscosity would drop enough to break the coating, or after significant sheer friction the coating would rupture and the mixture of the two coated powders would begin to react to form bonds between adjacent particles to form interconnected or continuous material.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. Coated particles for forming interconnected or continuous layers of material comprising:
   Material A comprising at least one meltable, softenable, or sinterable substance; and
   Material B comprising a material which is thermally or mechanically breachable;
   wherein Material B at least partially covers an outer surface of said first material, and wherein Material B inhibits Material A from fusing to, combining with, or reacting with adjacent coated and/or uncoated Material A when the coated particles are held at a temperature higher than the melting, softening or sintering point of uncoated Material A; and
   wherein Material A constitutes the main material of the resulting formed interconnected or continuous layer or layers of material.

2. The coated particles of claim 1, wherein Material A comprises a thermoplastic polymer.

3. The coated particles of claim 1, wherein Material A comprises a thermoplastic elastomer.

4. The coated particles of claim 1, wherein Material A comprises a metal.

5. The coated particles of claim 1, wherein Material A comprises a precursor of a thermoset polymer.

6. The coated particles of claim 1, wherein Material A is an agglomerate of particles.

7. The coated particles of claim 1, wherein Material A is a composite material comprising a polymer and/or copolymer and an additive that alters the chemical and/or physical properties of the polymer and/or copolymer composite material.

8. The coated particles of claim 1, wherein at least a portion of Material B is deposited onto Material A from a plasma phase.

9. The coated particles of claim 1, where Material B results from a treatment that etches, crosslinks, or densities the surface of Material A.

10. The coated particles of claim 1, wherein Material B is grafted by a monomeric unit to Material A.

11. The coated particles of claim 1, wherein Material B is deposited from a plasma activated depositing precursor.

12. The coated particles of claim 1, wherein Material B is a ceramic material.

13. The coated particles of claim 1, wherein Material B is a metal.

14. The coated particles of claim 1, wherein Material B is a silicone or silica.

15. The coated particles of claim 1, wherein Material B is a fluoropolymer.

16. The coated particles of claim 1, wherein Material B is a polyolefin, a polyacrylate, a polyamine, a polyamide, or an epoxy.

17. The coated particles of claim 1, wherein Material B is composed of two or more layers of different materials.

18. A composition comprising:
coated particles, wherein the coated particles comprise:
Material A comprising at least one meltable, softenable, or sinterable substance; and
Material B comprising a material which is thermally or mechanically breachable;
wherein Material B at least partially covers an outer surface of said first material, and wherein Material B inhibits Material A from fusing to, combining with, or reacting with adjacent coated and/or uncoated Material A when the coated particles are held at a temperature higher than the melting, softening or sintering point of uncoated Material A; and
uncoated particles of Material A;
wherein Material A constitutes the main material of the resulting formed interconnected or continuous layer or layers of material.

19. A method of forming a 3D object from coated particles, the method comprising:
obtaining coated particles, wherein the coated particles comprise:
Material A comprising at least one meltable, softenable, or sinterable substance; and
Material B comprising a material which is thermally or mechanically breachable;
wherein Material B at least partially covers an outer surface of said first material, and wherein Material B inhibits Material A from fusing to, combining with, or reacting with adjacent coated and/or uncoated Material A; and
heating the coated particles to a temperature sufficient to melt or soften Material A;
thermally or mechanically breaching the Material B coating in at least a portion of the coated particles, such that the coated particles having a breached Material B coating fuse to, combine with, or react with each other to form a portion of the 3D object.

* * * * *